United States Patent [19]

Meeks

[11] 3,924,731

[45] Dec. 9, 1975

[54] APPARATUS FOR RESTORING CANS TO UPRIGHT POSITIONS

[76] Inventor: James O. Meeks, 1606 32nd St., Nederland, Tex. 77627

[22] Filed: Nov. 15, 1974

[21] Appl. No.: 524,073

[52] U.S. Cl. ................ 198/268; 198/257; 198/282
[51] Int. Cl.² ............................................ B65G 47/24
[58] Field of Search .......... 198/236, 237, 238, 241, 198/249, 257, 268, 267, 282, 283, 285

[56] References Cited
UNITED STATES PATENTS

| | | | |
|---|---|---|---|
| 2,336,606 | 12/1943 | Everett | 198/249 |
| 3,269,512 | 8/1966 | Chutil | 198/283 |

*Primary Examiner*—Evon C. Blunk
*Assistant Examiner*—Robert Saifer
*Attorney, Agent, or Firm*—Donald Gunn

[57] ABSTRACT

An apparatus for turning upright any can in a conveyor system which happens to fall over on the conveyor to thereby enable the automatically functioning filling, sealing and labelling apparatus to handle the can in its expected upright position, thereby avoiding spilling or other malfunction of the system. The apparatus includes means cooperative with the conveyor system whereby fallen cans are grasped at the top rim and pulled upright as the conveyor system pushes cans along the conveyor. The conveyor system includes a side wall which supports a rotating wheel which carries hooks which face the direction from which the cans come. The hooks are located low in the conveyor at a point to grasp a can rim if a can has fallen. If a can has not fallen, the hooks are spring loaded to deflect on the curved exterior surface of a can.

11 Claims, 4 Drawing Figures

U.S. Patent  Dec. 9, 1975  3,924,731
FIG. 1
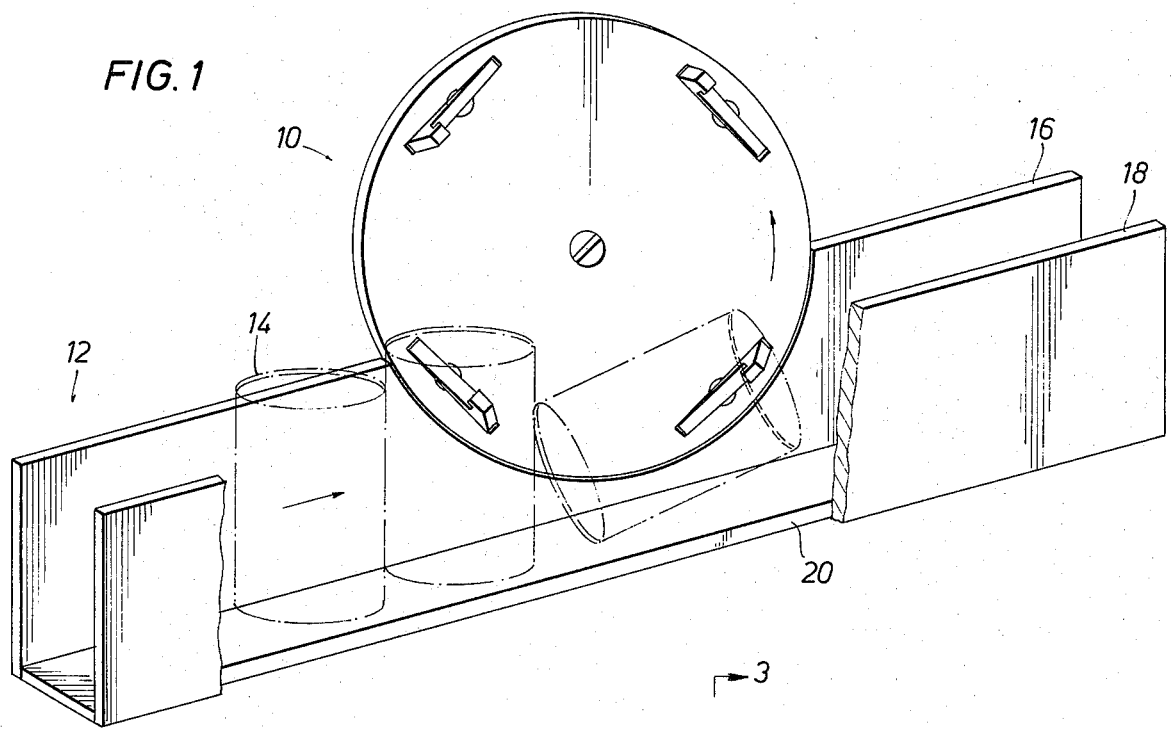
FIG. 2
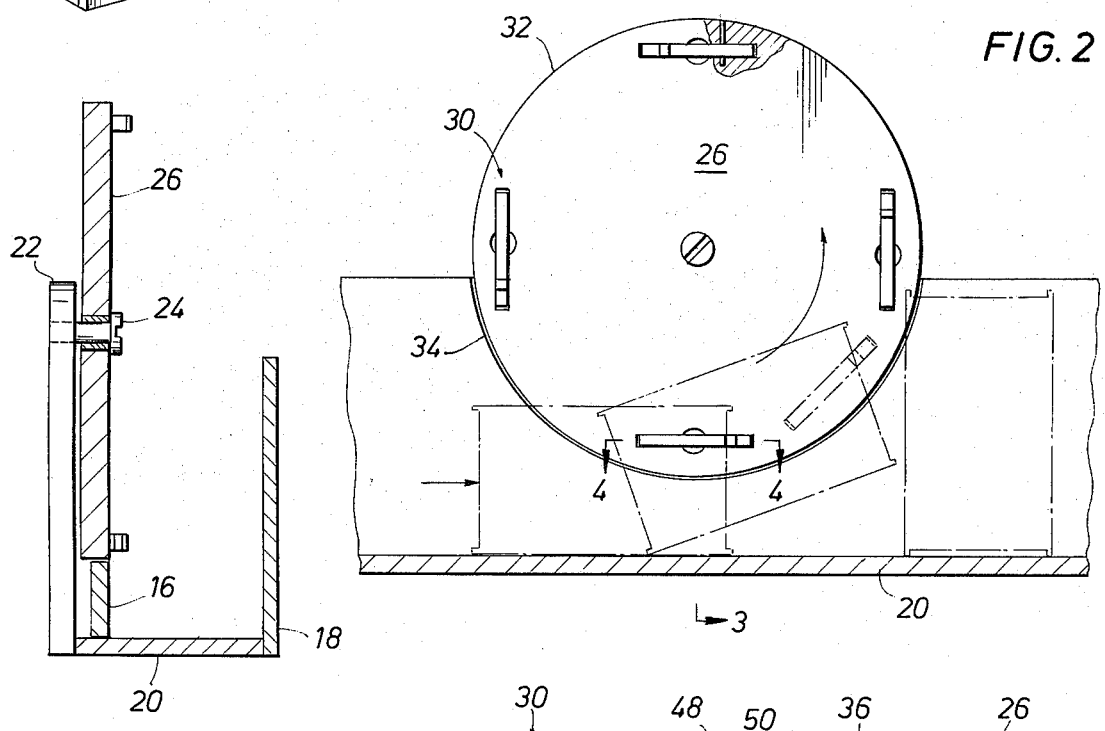
FIG. 3
FIG. 4
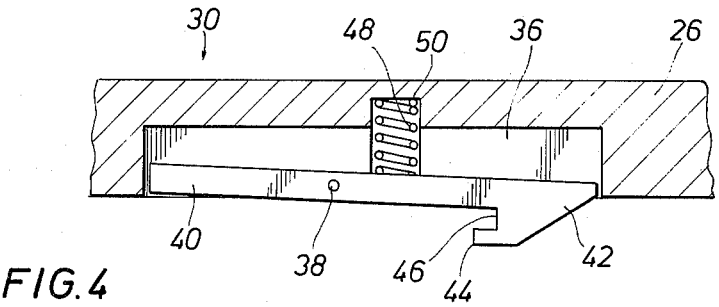

APPARATUS FOR RESTORING CANS TO UPRIGHT POSITIONS

BACKGROUND OF THE INVENTION

In bottling plants, conveyor systems carry cans by the hundreds from one piece of the equipment to another. Cans are expected to remain in an upright posture. The equipment is constructed to use the cans in an upright position. The steps of filling the can, sealing, labelling, and all other steps normally presume that the can will be upright relative to the conveyor system and the equipment. When the can falls over, it can at least cause the loss of product and may jam certain equipment. The present invention is adapted to be installed at many points along a conveyor system to prevent cans from jamming or otherwise delaying the ongoing process. If a can does fall over in the conveyor and is pushed along with the upright cans, the present invention returns the can to the upright position. This is achieved routinely without human intervention. The present invention can be installed at many points in a bottling or canning plant and left to operate indefinitely, thereby preventing harm or damage which results from fallen cans.

SUMMARY OF THE INVENTION

The present invention is an apparatus to be attached to a can conveyor system in a bottling or canning plant. Cans are normally transferred in a conveyor system which includes side walls which stand to an adequate height to capture the cans for movement along the specified path. The conveyor system is normally slightly wider than the can to be transferred. This guides the cans as they travel from one point to another. The present invention includes a means to be attached to one side wall of the conveyor system. It includes a rotatable wheel of circular configuration which supports a number of catch mechanisms. The wheel is scaled so that each catch mechanism passes adjacent to the path of a fallen can. It grasps the topmost rim and uprights the can. The catch mechanisms are spring loaded and deflect to an out-of-the-way position when they contact upright cans. Such contact is on the exterior at a point where there is no lip to grasp. The catch mechanisms are thus positioned along a circular locus of movement having a low point where the catch mechanism can grab the rim. The path of movement positions the catch mechanisms where they are moving in the direction of the cans on a conveyor and upwardly. As they circle and return to the beginning point, they move above the point of release where a can has been returned to the upright position from the fallen position. They are mounted for circular or rotational movement with about 180° or less of circular locus adjacent to the path of cans on the conveyor belt. Each catch mechanism incorporates a hook-shaped rim engaging means which is pivotally mounted and urged by a spring to a location where engagement will occur.

DESCRIPTION OF THE DRAWINGS

FIG. 1 is a perspective view of the device of the present invention installed on a conveyor system for moving cans;

FIG. 2 is a side view of the apparatus shown in FIG. 1 showing the position of a catch mechanism to engage a fallen can on the conveyor system and stand it upright;

FIG. 3 is a sectional view along the line 3—3 of FIG. 2 showing one means of mounting of a circular rotative mechanism for free wheeling movement adjacent to the path of cans carried on a conveyor system; and, FIG. 4 is a sectional view through a latch mechanism shown in FIG. 2 showing details of construction.

DESCRIPTION OF THE PREFERRED EMBODIMENT

In FIG. 1, the present invention 10 is installed adjacent to a conveyor 12. The conveyor 12 transports cans 14 from one location to another, typically in a bottling or canning works. The conveyor system 12 customarily includes a pair of adjacent side walls 16 and 18 which stand upright above a floor 20. The cans travel on the floor 20. The present invention is adapted for use with conveyors where the floor 20 supports the cans and they move by gravity, an upstream mechanism which forces cans into the conveyor, and those conveyor systems which have an endless belt, travelling chain and the like, in the bottom of the conveyor which pulls the cans along. The present invention is operative with cans of any size, ranging from small soft drink containers to large sizes intended for institutional use. The cans 14 are normally formed of sheet stock rolled into a cylinder. A bottom is placed on the cylinder, and a separate top placed after it has been filled. Tipping and falling is quite a problem with empty cans because they have no product to give them added weight. The present apparatus is cooperative with cans and containers which have a protruding lip or rim which encircles the bottom and top edges. This lip or rim extends beyond the top and bottom when assembled. The present invention is cooperative with an empty can having no top, an empty cylinder having no top or bottom, or a filled can which has been closed with a top and bottom. The present invention is able to turn upright cans which are empty or filled.

The conveyor 12 cooperates with apparatus supplying cans which forces them through the conveyor system. The cans are placed on the conveyor system by cooperative apparatus such as a can-making machine, labeling, or filling apparatus. A conveyor system will typically extend between various types of apparatus in a plant.

The present invention is adapted to be installed at many points along a conveyor system. It is not limited to a single installation, and the precise location is subject to variation. It is preferably placed in advance of every piece of equipment which requires that the cans be upright after they have been transported to the apparatus. As a consequence, the description sets forth the mode and manner in which the equipment operates. The equipment can be installed at many locations.

In FIG. 3, an upright member 22 extends above the conveyor and supports a shaft 24 which is typically a bolt. The bolt 24 supports a rotatable disc 26 which is located on the interior of the trough or U-shaped channel which guides the cans. The disc 26 is preferably circular and rotates about the shaft 24. The motive source for its rotation is the source of power which moves the cans along the conveyor system.

The disc 26 incorporates similar latch mechanisms 30 about its periphery. The disc 26 has an outer circumference 32. The outer circumference 32 preferably matches a semicircular notch 34 (see FIG. 2) cut in the side wall 16. The face of the disc 26 is approximately planar with the side wall 16.

The disc 26 supports the four latch mechanisms which are conveniently located at 90° locations about the disc. The number of latch mechanisms preferably exceeds three, and need not exceed six or seven. The number is preferably four so that one is pulled to a ready position after rotation of the disc by engagement of one of the other latch mechanisms with a previous fallen can.

In FIG. 4, an individual latch mechansm 30 is shown. They are all identical, and are scaled to match the edge of the can to be handled by the conveyor 12. The disc 26 has a rectangular notch 36 cut in one side. The notch or receptacle 36 is intercepted by the mounting pin 38 which mounts for pivotal movement an elongate arm 40. The arm 40 is dimensioned and mounted so that it fits on the transverse shaft 38 for rotational movement and is received in the cavity 36. The arm 40 extends to a tapered front end 42. It is so positioned that the taper extends from the exposed face of the disc 26. Because of this arrangement, sharp edges are not presented by the latch mechanism 30 as viewed from an upstream location in the conveyor system. The tapered surface 42 enables the apparatus to contact the outer surface of upright cans and slide past them as will be described. The tapered edge 42 abuts the cylindrical side wall of upright cans in a fashion that avoids picking them up.

The arm 40 supports and overhanging hook member 44. The hook member 44 is adjacent to an undercut notch 46 which is undercut to enable the overhanging hook member 44 to engage the upper lip or rim of a can.

A coil spring 48 is recessed in an opening 50 drilled in the disc 26. The coil spring is located to force the hook member 44 to an outward location. However, the cavity 36 is sufficiently deep to enable the hook member to be depressed and forced into the cavity, thereby retracting it to a position enabling cans to pass by without being hooked at the lip or rim. When the hook 44 is depressed, the arm 40 will pivot outwardly. The extended position is shown in FIG. 4, and the retracted position is achieved on pressing the hook 44 toward the cavity 36.

Several identical latch mechanisms are arranged on the equipment. The apparatus is dimensioned as follows. The disc 26 is located at an elevation to hold one of the latch mechanisms basically horizontal, and with the open or hooking side of the latch facing upstream. It is raised above the floor 20 of the conveyor by a distance to enable the hook 44 to extend outwardly and grab the lip or rim of a fallen can. The hook 44 and the throat 46 are dimensioned to engage the lip or rim on reaching over the can top. In opposite fashion, the hook 44 and the throat 46 are relatively small to enable them to contact the cylindrical exterior of a can and be depressed. The depression of the hook into the recess occurs when an upright can passes. The distance between the side walls 16 and 18 need not provide a tight clearance for the cans, but rather some extra clearance is provided. The clearance can be in the range of 1/16th to 1/8th inch on small cans and slightly larger on large cans.

It will be noted that the diameter of the disc 26 and its spacing above the bottom 20 is such that the hook pulls upwardly while moving along with a fallen can. It rotates upwardly and pulls away from the can when it is turned upright. This preferably occurs so that it can move further above the lid of the can which was grasped by the hook, and escapes the can, thereby enabling the can to move forwardly after being uprighted. FIG. 2 represents a fallen can at the initial or beginning position after it has fallen and is pushed along between the side walls 16 and 18. A hook is positioned on one of the latch mechanisms at the six o'clock position ideally. The hook will engage the can at a range of positions, including variations from the six o'clock position to the right and left perhaps as much as 40° or so. The hook pulls the can toward an upright position and toward the point of release which occurs before the can achieves the full upright position shown in FIG. 2 at the far right. The point of release preferably occurs no later than the three o'clock position. The can is turned partly upright at the intermediate dotted line position. While the hook turns the can close to the upright position, the can immediately behind it keeps on pushing it to achieve stability at the upright position. This is achieved approximately when the hook is past the four o'clock position but still moving upwardly past the three o'clock position.

It will be understood from the foregoing how the hook pulls free of the can at some point, depending on the relative dimensions of the equipment, size of the can, rapidity with which the can is turned from the horizontal to the vertical. The latch mechanism on the right is located at the three o'clock position, but the hook is located at the upper extremity of the mechanism and has proceeded far out of reach of the can which is turned upright by it. The apparatus functions with a forward impetus proceeding from left to right either from the equipment which supplies the cans upstream of the views illustrated or with a moving conveyor system including a moving belt on the bottom 20.

The apparatus is passive in that it requires no power for its own operation. It free wheels when all the cans are upright. As shown in FIG. 1, the latch mechanism located at the eight o'clock position protrudes into the pathway of the upright cans. This provides no impediment to the procession of cans. Rather the cans move past by depressing the hook or force the disc to rotate, which continually moves the hooks back to a position for turning the cans upright.

The foregoing is directed to the preferred embodiment of the apparatus. Many alterations and variations can be incorporated. The scope is determined by the claims which follow.

I claim:

1. An apparatus cooperative with a conveyor system moving a procession of cans having a top lip or edge where the conveyor system confines the cans along a path of movement between a pair of sides spaced apart by a distance wider than the cans and where the conveyor bottom supports the cans in an upright position and the cans move along the conveyor system, and a can is liable to fall over and be pushed along the conveyor along with upright cans, wherein the apparatus comprises a movable means which supports a can lip engaging means located for movement along a path which hooks the lip of a fallen can supported on the conveyor system, said can lip engaging means being ineffective in hooking an upright can on the conveyor system, said movable means moving said can lip engaging means along a path which rotates the fallen can from the fallen position toward an upright position on the conveyor system.

2. The apparatus of claim 1 wherein said movable means is supported on an axis means for rotation about said axis means, said axis means being located above and parallel to the bottom of the conveyor system.

3. The apparatus of claim 1 wherein said movable means includes a vertically aligned rotatable disc having a face exposed at one side of the conveyor system and supporting said can lip engaging means on the exposed face.

4. The apparatus of claim 1 wherein said can lip engaging means is mounted on said movable means to move along an arc of travel comprising a portion of a circular path which has a low point where the path is adjacent to the lip of a fallen can and said can lip engaging means extends into the pathway of a fallen can carried on the conveyor system and the circular path extends above the top of an upright can, and the fallen can is pushed along the conveyor system and is pulled upright by movement of the conveyor system constrained by said can lip engaging means.

5. The apparatus of claim 1 wherein said can lip engaging means faces the procession of cans and is positioned at a beginning point for operation by said movable means which point is sufficiently high in the conveyor system to engage the lip around the top end of a fallen can, and said movable means moves it to an elevated position above the height of an upright can to disengage a can after it has been uprighted.

6. The apparatus of claim 5 wherein said can lip engaging means is limited in its angular position at which it can accept and engage a can by means including an undercut overhanging member which faces the direction from which cans approach and said movable means rotates said can lip engaging means to cause disengagement from an engaged can on uprighting the can.

7. The apparatus of claim 1 wherein said movable means includes
an axis means;
a support means mounted on said axis means for rotation thereabout, said support means positioning and supporting said can lip engaging means; and,
means for positioning said axis means such that said support means is rotated in the conveyor system adjacent to the locus of fallen cans.

8. The apparatus of claim 7 wherein said can lip engaging means includes an overhanging hook, an undercut shank means connected to said hook to define a means for hooking a can lip, and means resiliently mounting said shank means on said support means to extend into the conveyor system adjacent to the locus of fallen cans.

9. The apparatus of claim 8 wherein said support means includes a plurality of can lip engaging means spaced about said support means at angular distances to enable said can lip engaging means to engage and upright a fallen can while the cans on the conveyor system move forwardly which movement rotates said support means sufficiently to bring another can lip engaging means into position to engage and upright a subsequent fallen can.

10. The apparatus of claim 9 wherein each can lip engaging means extends into the path of upright cans and is deflected resiliently by the cans moving therepast to cause said support means to rotate, and said can lip engaging means engages a fallen can over a specified angular range of positions relative to said axis means.

11. An apparatus for cooperation with a conveyor system which transfers cans along a conveyor path defined by a pair of facing side walls where the cans are supported on a bottom and which comprises a means for supporting for circular movement a plurality of latch means which extend into the path of cans travelling on the conveyor system and which have a locus carrying them to a point of interception of the rim at the top or bottom of a fallen can on the conveyor system and which have a hook means for latching such a rim, and which hook means further does not latch on the exterior cylindrical surface of an upright can.

* * * * *